UNITED STATES PATENT OFFICE.

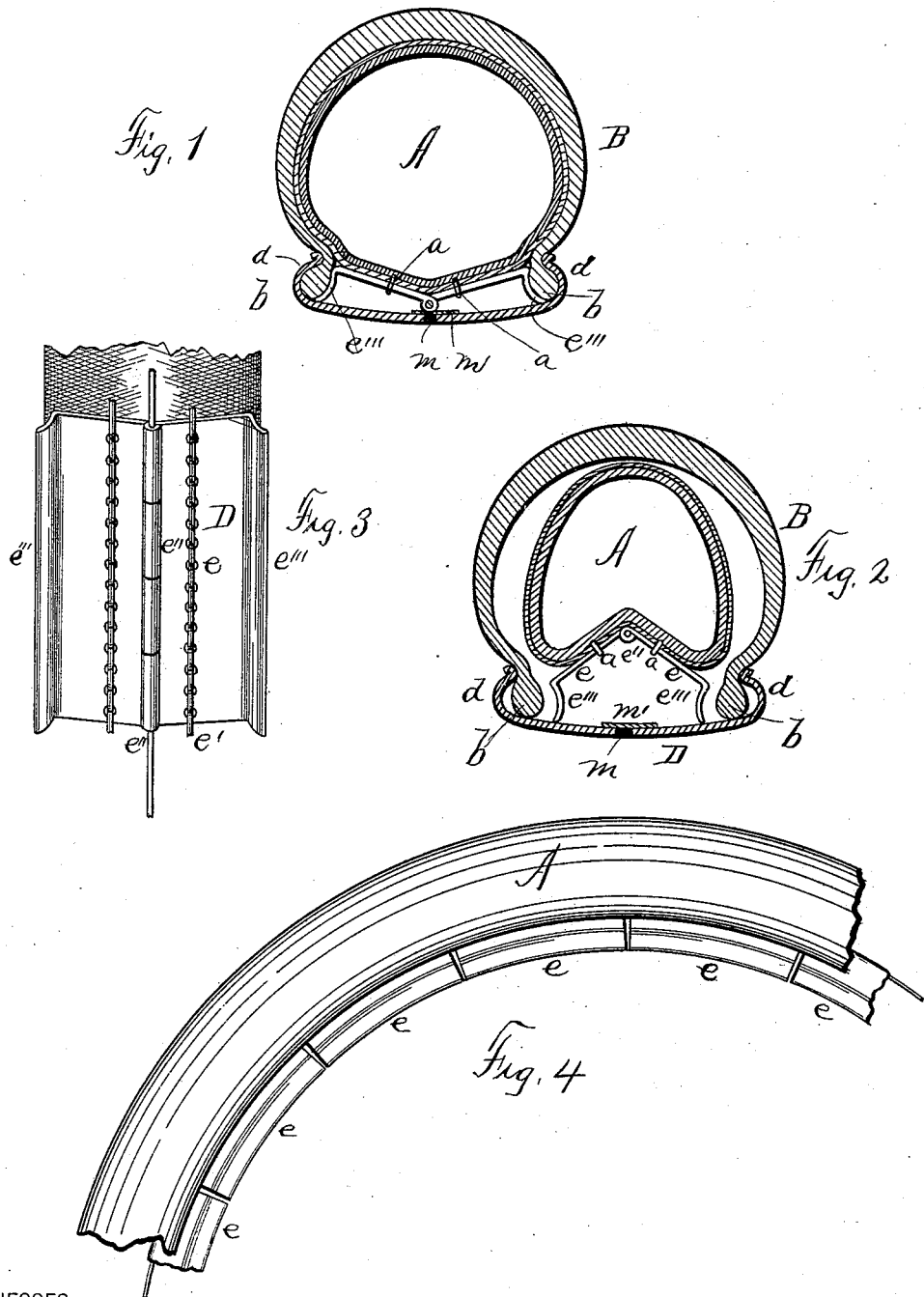

GEORGE F. STILLMAN, OF SYRACUSE, NEW YORK.

VEHICLE-TIRE.

SPECIFICATION forming part of Letters Patent No. 495,277, dated April 11, 1893.

Application filed October 8, 1892. Serial No. 448,185. (No model.)

*To all whom it may concern:*

Be it known that I, GEORGE F. STILLMAN, of Syracuse, in the county of Onondaga, in the State of New York, have invented new and useful Improvements in Vehicle-Tires, of which the following, taken in connection with the accompanying drawings, is a full, clear, and exact description.

My invention relates to vehicles and particularly to the tires for the wheels therefor.

My object is to produce a pneumatic tire which is locked onto the rim of the wheel automatically by the inflation of the pneumatic tube or sack; comprising a series of sectional grip plates, each plate being divided longitudinally and having their meeting edges hinged together or otherwise connected to each other; said plates having their outer edges complementary to the inner faces of the edges of the shoe, cover or casing embracing the pneumatic sack; and being adapted to make an air-tight joint between said shoe and the rim; said plates being also adapted to be forced inwardly until the hinge or other joint is past the center, and will remain in such position even when the sack is deflated, means being provided to unlock said plates.

My invention consists in the several novel features of construction and operation hereinafter described and which are specifically set forth in the claims hereunto annexed. It is constructed as follows, reference being had to the accompanying drawings, in which Figure 1, is a transverse section of the tire inflated. Fig. 2, is a like view of the same deflated. Fig. 3, is a bottom plan of part of the pneumatic sack, detached. Fig. 4, is a side elevation of the same.

A—, is the pneumatic sack of any construction desired. B—, is the outer shoe, cover or casing embracing the sack and having its edges —b— thickened or enlarged, substantially as shown.

D—, is the rim of the wheel, having its edges —d— turned inwardly, forming pockets complementary to the exterior faces of the edges of the shoe.

The sack may be provided with a series of eyes or staples —a— which are adapted to pass through perforations in the leaves —e—, and —e'— is a wire inserted through said eyes inside of said leaves, as one means of securing them to the sack. I do not limit myself to any fastening, reserving to myself the right to dispense with all means for securing said leaves to said sack rigidly or detachably. These leaves are hinged or otherwise connected together at their meeting edges, as at —e"—, and their outer edges —e'''— are bent, substantially as shown, complementary to the inner faces of the edges of the shoe, or otherwise adapted to operate in conjunction with the pockets —d— to grip the edges of the shoe, tightly and firmly and with an air-tight joint.

In Fig. 2 the tire is shown as ready to be inflated and the inflation thereof will gradually flatten the leaves and force their edges outward toward the edges of the shoe and the pockets in the rim, and eventually when the tire is inflated, said leaves will not only be wholly flattened but the joint between them will be forced down below a horizontal (the center) and will rest upon the rim, substantially as shown, and the edges of the shoe will be firmly secured, gripped and locked.

To remove the tire it must be deflated, and the locking leaves must be raised to substantially the position shown in Fig. 2, which may be done by inserting a tool through the valve hole into the rim, which will raise the joint of the section at that point, and then by pressing the edges of the shoe inward at that point the leaves will be forced into substantially the position shown in Fig. 2, and thereafter the leaves of the other sections can be readily reached and opened until the whole shoe is released.

The several grip-plates may be connected together by the extension of the pintle of one plate into the joint of the adjoining plate, or by running it through the joints of several or all of the plates as a continuous pintle upon which the leaves are strung. Or the leaves may each consist of a band, continuous around the rim, and have their inner edges connected at intervals if desired.

It will be seen that even if the tire becomes accidentally deflated, it cannot fly or slip off from the rim, until a positive force is exerted in such direction and manner as to raise part of said leaves away from the rim, as shown in Fig. 2, sufficiently to unlock the shoe.

What I claim as my invention, and desire to secure by Letters Patent, is—

1. The combination with the sack, shoe and rim, of sectional lock plates connected together and adapted to be expanded laterally by the inflation of the sack.

2. The combinatian with the sack, shoe and rim, of sectional lock plates connected together and adapted to be expanded laterally by the inflation of the sack until the joint is below the center.

3. The combination with the sack, the shoe having thickened edges, and the rim having edge pockets complementary to the edges of the shoe, of sectional lock plates, connected together, having their outer edges complementary to the edges of the shoe, and adapted to be expanded laterally by the inflation of the sack.

4. In a vehicle tire, a rim provided with pockets, a pneumatic sack, a shoe embracing it, and sectional locking plates laterally expansible by the inflation of the sack to lock the edges of the shoe into said pockets, in combination as set forth.

5. The combination with the shoe and the rim, of sectional locking plates expansible laterally to engage with the edges of the shoe, and compress them against the edges of the rim.

In witness whereof I have hereunto set my hand this 27th day of September, 1892.

GEO. F. STILLMAN.

In presence of—
C. W. SMITH,
HOWARD P. DENISON.